US012671327B2

(12) United States Patent
Yu et al.

(10) Patent No.: US 12,671,327 B2
(45) Date of Patent: Jun. 30, 2026

(54) HYBRID SWITCHING CONVERTER CIRCUIT HAVING CIRCULATION CURRENT

(71) Applicant: Richtek Technology Corporation, Zhubei City (TW)

(72) Inventors: Chun-Jen Yu, Taoyuan (TW); Chi-Jen Yang, Hsinchu (TW); Tao-Cheng Yu, Hsinchu (TW); Cheng-Wei Chung, Kaohsiung (TW)

(73) Assignee: RICHTEK TECHNOLOGY CORPORATION, Zhubei City (TW)

( * ) Notice: Subject to any disclaimer, the term of this patent is extended or adjusted under 35 U.S.C. 154(b) by 237 days.

(21) Appl. No.: 18/605,856

(22) Filed: Mar. 15, 2024

(65) Prior Publication Data

US 2025/0211105 A1     Jun. 26, 2025

(30) Foreign Application Priority Data

Dec. 20, 2023     (TW) ................................. 112149787

(51) Int. Cl.
H02M 3/07 (2006.01)
H02M 1/00 (2006.01)
H02M 3/158 (2006.01)

(52) U.S. Cl.
CPC ............ *H02M 3/07* (2013.01); *H02M 1/0095* (2021.05); *H02M 3/1582* (2013.01)

(58) Field of Classification Search
CPC ...................... H02M 3/07–078; H02M 1/0095
See application file for complete search history.

(56) References Cited

U.S. PATENT DOCUMENTS

2022/0321001 A1 * 10/2022 Huang .................... H02M 3/07

* cited by examiner

*Primary Examiner* — Peter M Novak

(74) *Attorney, Agent, or Firm* — Tung & Associates

(57) ABSTRACT

A switching converter circuit includes: a power stage circuit and a current sensing circuit. The power stage circuit includes plural power switches, which include a circulation switch. The circulation switch is coupled in parallel to an inductor. When the circulation switch is turned ON, the inductor and the circulation switch constitute a circulation circuit. The current sensing circuit generates a current sensing signal. The power switches switch a switching node voltage at a switching node, thereby converting an input power to an output power. The circulation switch is controlled to be ON within a circulation period in each switching cycle, so that the switching node voltage is conducted to the output voltage. In a steady state, the inductor current circulates within the circulation circuit with a DC current level. The DC current level is lower than a peak of the inductor current.

10 Claims, 18 Drawing Sheets

|  | Prior Art | Prior Art | Present Invention |
|---|---|---|---|
|  | Voltage Mode Not Having Circulation | Current Mode Not Having Circulation | Voltage Mode Having Circulation |
| Unit Gain Bandwidth (kHz) | 160 | 175 | 319 |
| Phase Margin(°) | 4.7 | 37 | 81 |

Fig. 15

HYBRID SWITCHING CONVERTER CIRCUIT HAVING CIRCULATION CURRENT

CROSS REFERENCE

The present invention proposes a hybrid switching converter circuit having circulation current, which simplifies compensation, reduces output ripple, and improve power conversion efficiency.

BACKGROUND OF THE INVENTION

Field of Invention

The present invention relates to a switching converter circuit; particularly, it relates to a hybrid switching converter circuit having circulation current.

Description of Related Art

Please refer to FIG. 1, which shows a schematic circuit diagram of a conventional switching converter circuit. The conventional switching converter circuit 101 includes plural power switches S1~S3 and S6~S7. The plural power switches S1~S3 and S6~S7 switch an inductor L1 according to corresponding operation signals VS1~VS3 and VS6~VS7, respectively, thus converting an input voltage VIN to an output voltage VOUT. The inductor L1 is coupled between a switching node LX and the output voltage VOUT. The plural power switches S1~S3 and S6~S7 include: high side switches S3 and S6, a ground switch S2, a low side switch S7 and a pump switch S1. The high side switch S6 is coupled between an end Nc1 of a capacitor C1 and a switching node LX; the high side switch S3 is coupled between the end Nc1 of the capacitor C1 and the input voltage VIN; the ground switch S2 is coupled between another end Nc2 of the capacitor C1 and a ground potential; the low side switch S7 is coupled between the switching node LX and the ground potential; the pump switch S1 is coupled between the end Nc2 of the capacitor C1 and the input voltage VIN. In addition to switching the inductor L1, the plural power switches S1~S3 and S6~S7 further switch the capacitor C1, wherein the end Nc1 of the capacitor C1 is coupled to the switching node LX. The prior art switching converter circuit 101 shown in FIG. 1 has drawbacks that: its compensation circuit is difficult to design; and, it has a high output ripple and low power conversion efficiency.

SUMMARY OF THE INVENTION

From one perspective, the present invention provides a switching converter circuit, which is configured to operably convert an input power to an output power, wherein the input power includes an input voltage and the output power includes an output voltage; the switching converter circuit comprising: a feedback compensation circuit, which is configured to operably generate a feedback compensation signal according to a difference between a feedback signal related to the output power and a reference signal; a modulation circuit, which is configured to operably generate a modulation signal in accordance with the feedback compensation signal and a ramp signal having a switching cycle; a power stage circuit including a plurality of power switches, wherein the plurality of power switches are configured to operably switch an inductor according to the modulation signal, thus converting the input power to the output power, wherein the inductor is coupled between a switching node and the output power, wherein the plurality of power switches include a circulation switch, wherein the circulation switch is coupled in parallel with the inductor, wherein when the circulation switch is turned ON, the inductor and the circulation switch constitute a circulation circuit; a current sensing circuit, which is configured to operably generate a current sensing signal, wherein the current sensing signal is related to an inductor current flowing through the inductor; and a control and driver circuit, which is configured to operably generate a driving signal according to the modulation signal and the current sensing signal, wherein the driving signal is configured to operably control the plurality of power switches; wherein in a step-down mode, the plurality of power switches are configured to operably switch the switching node, so that a switching node voltage at the switching node is switched between the input voltage and a ground potential, thus converting the input power to the output power, wherein the input voltage is greater than or equal to the output voltage; wherein in the step-down mode, within a circulation period in each switching cycle, the circulation switch is controlled to be ON, so that the switching node voltage is conducted to the output voltage; wherein in a steady state, the inductor circulates current within the circulation circuit with a first DC current level, wherein the first DC current level is lower than a peak of the inductor current.

In one embodiment, the plurality of power switches are further configured to operably switch a capacitor, wherein an end of the capacitor is coupled to the switching node; wherein in a step-up mode, the plurality of power switches are configured to operably switch the capacitor and the inductor, so that the switching node voltage at the switching node is switched between a pumped voltage and the input voltage, thus converting the input power to the output power, wherein the pumped voltage is greater than the input voltage, and wherein the pumped voltage is correlated with the input voltage and a voltage across the capacitor, wherein the output voltage lies between the pumped voltage and the input voltage; wherein in the step-up mode, within the circulation period in each switching cycle, the circulation switch is controlled to be ON, so that the switching node voltage is conducted to the output voltage, whereby the inductor current circulates within the circulation circuit with a second DC current level; wherein in a steady state, the second DC current level is lower than the peak of the inductor current.

In one embodiment, in a buck-boost mode, the plurality of power switches are configured to operably switch the capacitor and the inductor, so that the switching node voltage at the switching node is switched between the pumped voltage, the input voltage and the ground potential, thus converting the input power to the output power, wherein the output voltage is greater than, lower than or equal to the input voltage.

In one embodiment, the ramp signal is generated according to a clock signal having the switching cycle, wherein the switching cycle has a constant period, such that the modulation signal has the constant period.

In one embodiment, the modulation circuit is configured to operably compare the feedback compensation signal with the ramp signal having the constant period, so as to decide a duty ratio of the modulation signal, thereby regulating an electrical characteristic of the output power to a target value.

In one embodiment, the switching converter circuit further comprises: a sample and hold circuit; wherein in the step-down mode, subsequent to a first time point at which the inductor begins to be demagnetized, at a second time point after a preset delay time has passed by the first time point, the sample and hold circuit is configured to operably sample and hold the current sensing signal, so as to obtain a step-down sample level, wherein within the present switching cycle, when the current sensing signal decreases to reach the step-down sample level, the circulation period corresponding to the present switching cycle is initiated and the circulation switch is turned ON; and/or wherein in the step-up mode, subsequent to a third time point at which the inductor begins to be demagnetized, at a fourth time point after the preset delay time has passed by the third time point, the sample and hold circuit is configured to operably sample and hold the current sensing signal, so as to obtain a step-up sample level, wherein within the present switching cycle, when the current sensing signal decreases to reach the step-up sample level, the circulation period corresponding to the present switching cycle is initiated and the circulation switch is turned ON.

In one embodiment, in the step-down mode or the step-up mode, within the circulation period corresponding to the step-down mode or the circulation period corresponding to the step-up mode, when the circulation switch is turned ON, the inductor and the circulation switch constitute the circulation circuit, such that a double pole generated by the inductor and an output capacitor at least partially degenerates toward a single pole, thus enhancing a stability and bandwidth of the switching converter circuit.

In one embodiment, the plurality of power switches include: a high side switch coupled between the input power and the switching node; a ground switch coupled between another end of the capacitor and the ground potential; a low side switch, which is coupled between the switching node and the another end of the capacitor or which is coupled between the switching node and the ground potential; and a pump switch coupled between the another end of the capacitor and the input power.

In one embodiment, in a bypass mode, the high side switch is always ON, so as to bypass the input power to the output power via the inductor.

In one embodiment, a time length of the circulation period is correlated with a stability of the switching converter circuit and/or a power conversion efficiency of the switching converter circuit.

In one embodiment, in a case where the low side switch is coupled between the switching node and the another end of the capacitor, the low side switch and the ground switch are transistors having a same withstand voltage.

The objectives, technical details, features, and effects of the present invention will be better understood with regard to the detailed description of the embodiments below, with reference to the attached drawings.

The present invention claims priority to the TW patent application No. 112149787, filed on Dec. 20, 2023 and published on Mar. 11, 2025, the entire contents of which are incorporated herein by reference.

BRIEF DESCRIPTION OF THE DRAWINGS

FIG. 15 shows a comparison table between the present invention and the prior art with respect to unity gain bandwidth and phase margin.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
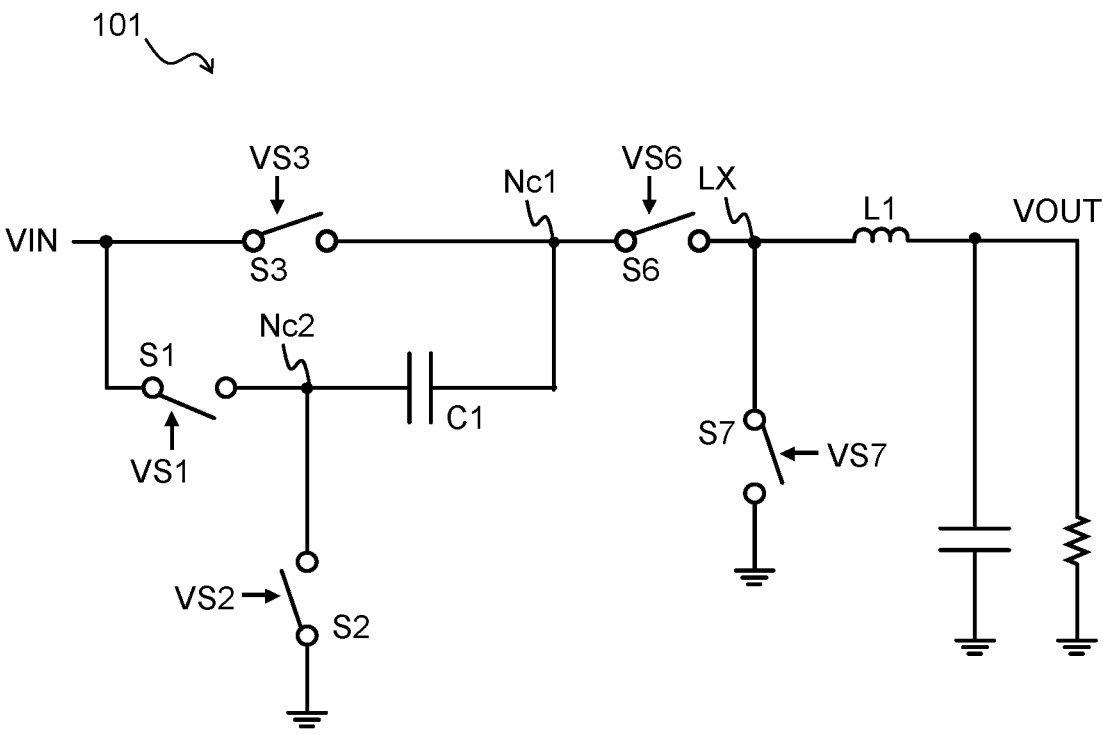
FIG. 1 shows a schematic circuit diagram of a conventional switching converter circuit.
Figure 2A:
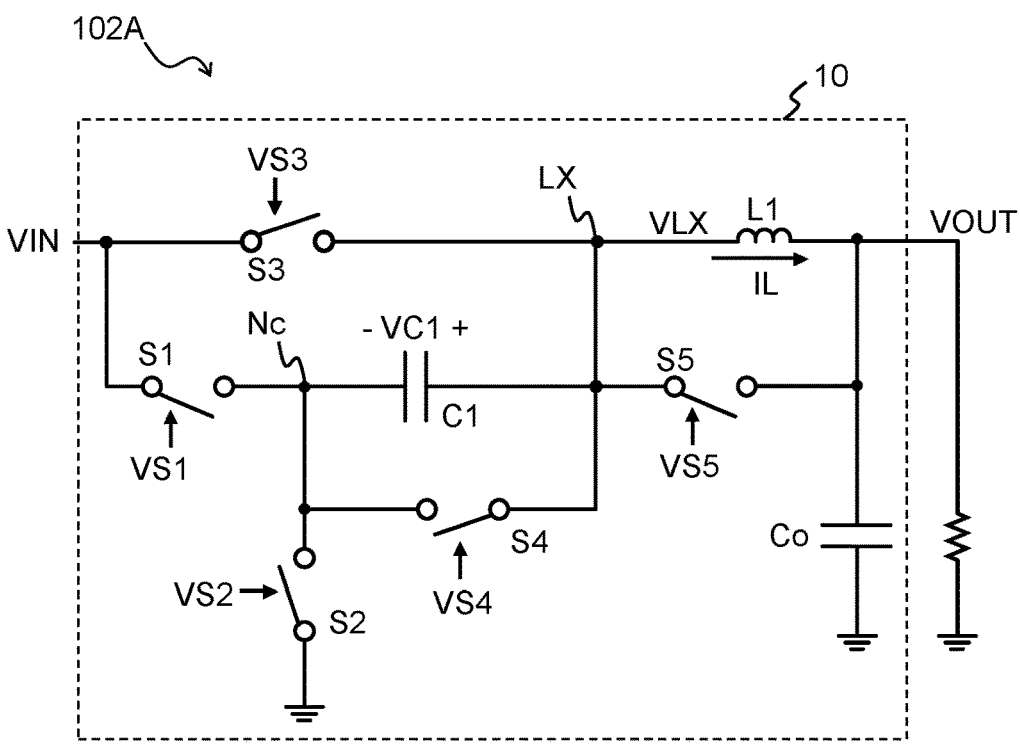
FIG. 2A shows a schematic circuit diagram of a switching converter circuit according to an exemplary embodiment of the present invention.
Figure 3A:
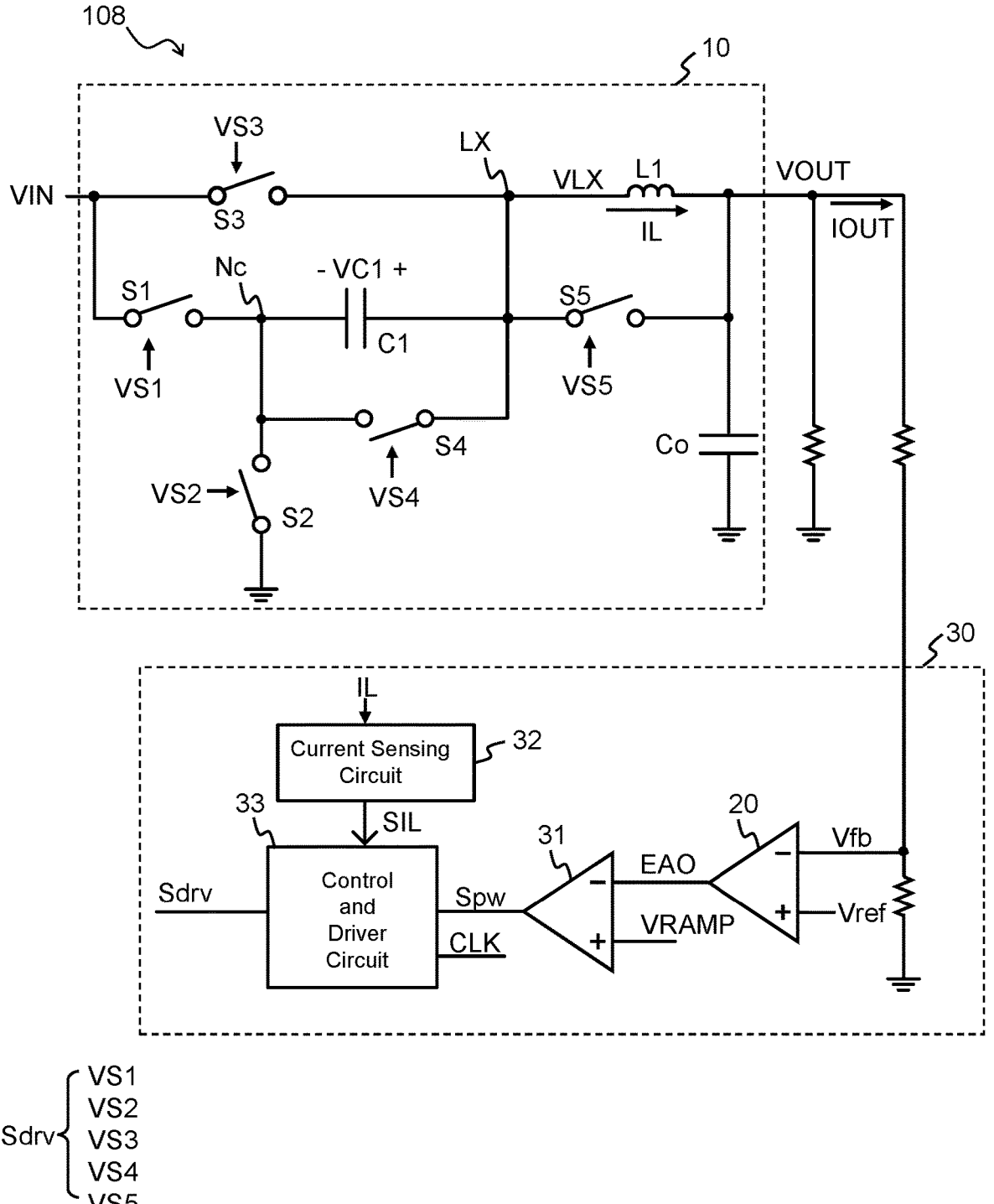
FIG. 3A shows a schematic circuit diagram of a converter control circuit in a switching converter circuit according to an exemplary embodiment of the present invention.

FIG. 2A shows a schematic circuit diagram of a switching converter circuit according to an exemplary embodiment of the present invention. As shown in FIG. 2A, the switching converter circuit 102A of the present invention is configured to operably convert an input power to an output power. In this embodiment, the input power includes an input voltage VIN and the output power includes an output voltage VOUT. In one embodiment, the switching converter circuit 102A of the present invention comprises a power stage circuit 10. In one embodiment, the power stage circuit 10 includes plural power switches S1~S5. Please refer to FIG. 2A along with FIG. 3A. FIG. 3A shows a schematic circuit diagram of a converter control circuit 30 in a switching converter circuit 108 according to an exemplary embodiment of the present invention. The plural power switches S1~S5 are configured to operably switch an inductor L1 according to a driving signal Sdrv generated according to a modulation signal Spw, thus converting the input power to the output power. The detailed features of the driving signal Sdrv and modulation signal Spw will be further explained later. Please still refer to FIG. 2A. The inductor L1 is coupled between a switching node LX and the output power.

The plural power switches S1~S5 include a circulation switch S5, wherein the circulation switch S5 is coupled in parallel with the inductor L1. When the circulation switch S5 is turned ON, the inductor L1 and the circulation switch S5 constitute a circulation circuit. In addition to the circulation switch S5, the plural power switches S1~S5 further include: a high side switch S3, a ground switch S2, a low side switch S4 and a pump switch S1. As shown in FIG. 2A, the plural power switches S1~S5 are configured to further switch a capacitor C1, wherein an end of the capacitor C1 is coupled to a switching node LX. The high side switch S3 is coupled between the input power and the switching node LX; the ground switch is coupled between another end Nc of the capacitor C1 and the ground potential; the low side switch S4 is coupled between the switching node LX and the end Nc of the capacitor C1; and, the pump switch is coupled between the end Nc of the capacitor C1 and the input power.

Figure 2B:
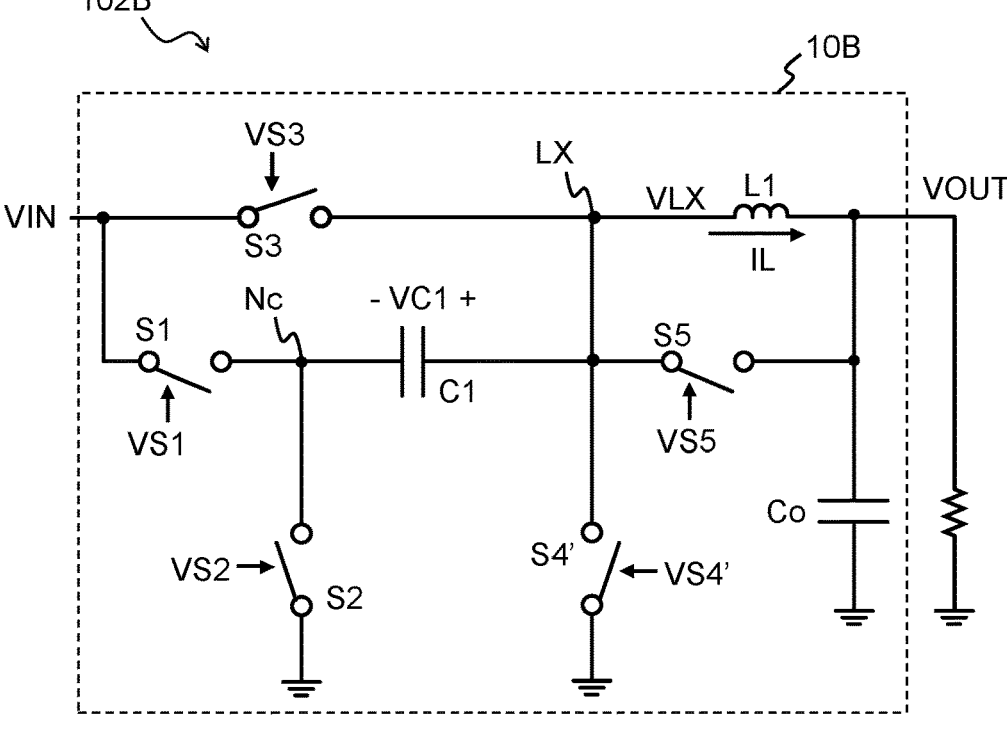
FIG. 2B shows a schematic circuit diagram of a switching converter circuit according to another exemplary embodiment of the present invention.

FIG. 2B shows a schematic circuit diagram of a switching converter circuit according to another exemplary embodiment of the present invention. The switching converter circuit 102B of this embodiment shown in FIG. 2B is similar to the switching converter circuit 102A of the embodiment shown in FIG. 2A, but is different in that: in the switching converter circuit 102B of this embodiment shown in FIG. 2B, a low side switch S4' in the power stage circuit 10B of the switching converter circuit 102B is coupled between the switching node LX and the ground potential.

It is worthwhile mentioning that, according to the present invention, the aforestated power stage circuit 10 or 10B whose operation includes a circulation period, can cooperate with a converter control circuit of several different modes. The following are several non-limiting examples.

FIG. 3A shows a schematic circuit diagram of a converter control circuit 30 in a switching converter circuit 108 according to an exemplary embodiment of the present invention. The switching converter circuit 108 of this embodiment shown in FIG. 3A employs the power stage circuit 10 of the embodiment shown in FIG. 2A. The converter control circuit 30 of this embodiment shown in FIG. 3A controls the power stage circuit 10 to operate in a voltage mode. As shown in FIG. 3A, the switching converter circuit 108 of this embodiment includes the converter control circuit 30. In one embodiment, the converter control circuit 30 includes: a feedback compensation circuit 20, a modulation circuit 31, a current sensing circuit 32 and a control and driver circuit 33. The feedback compensation circuit 20 is configured to operably generate a feedback compensation signal EAO according to a difference between a feedback signal Vfb related to the output power and a reference signal Vref. The modulation circuit 31 is configured to operably generate a modulation signal Spw for example by comparing the feedback compensation signal EAO with a ramp signal VRAMP having a switching cycle. The current sensing circuit 32 is configured to operably generate a current sensing signal SIL, wherein the current sensing signal SIL is related to an inductor current IL flowing through the inductor L1. In following embodiments, the current sensing signal SIL is positively correlated with the inductor current IL flowing through the inductor L1, but this is only an illustrative example, not for limiting the broadest scope of the present invention. The control and driver circuit 33 is configured to operably generate a driving signal Sdrv according to the modulation signal Spw, a clock signal CLK and the current sensing signal SIL, wherein the driving signal Sdrv is configured to operably control the plural power switches S1~S5. As shown in FIG. 3A, the driving signal Sdrv includes operation signals VS1~VS5.

Figure 3B:
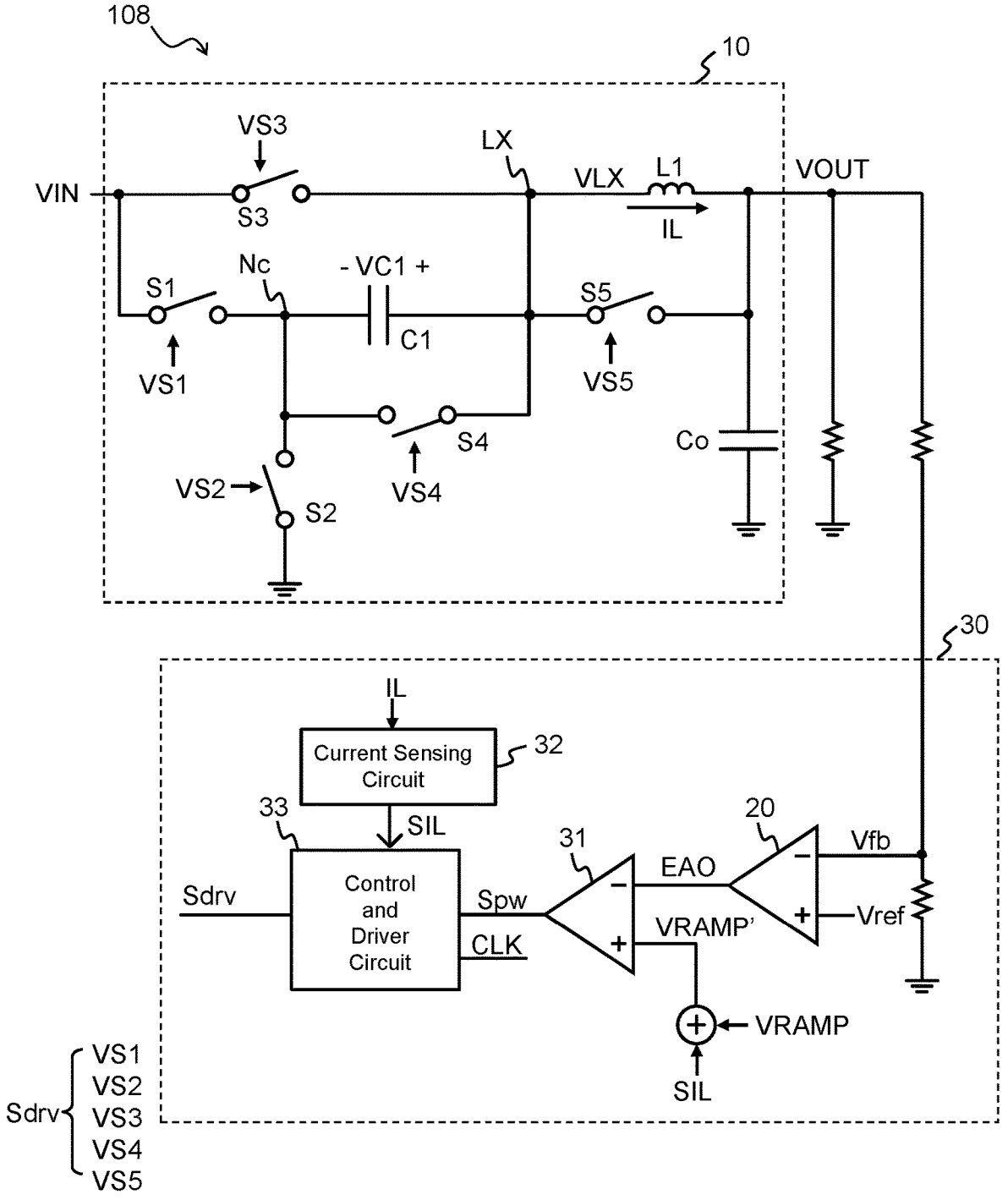
FIG. 3B shows a schematic circuit diagram of a converter control circuit in a switching converter circuit according to another exemplary embodiment of the present invention.

FIG. 3B shows a schematic circuit diagram of a converter control circuit in a switching converter circuit according to another exemplary embodiment of the present invention. The converter control circuit 30 of this embodiment shown in FIG. 3B controls the power stage circuit 10 to operate in a current mode. The converter control circuit 30 of this embodiment shown in FIG. 3B is similar to the converter control circuit 30 of the embodiment shown in FIG. 3A, but is different in that: in the converter control circuit 30 of this embodiment shown in FIG. 3B, the ramp signal VRAMP' is a sum of the ramp signal VRAMP and the current sensing signal SIL.

Figure 3C:
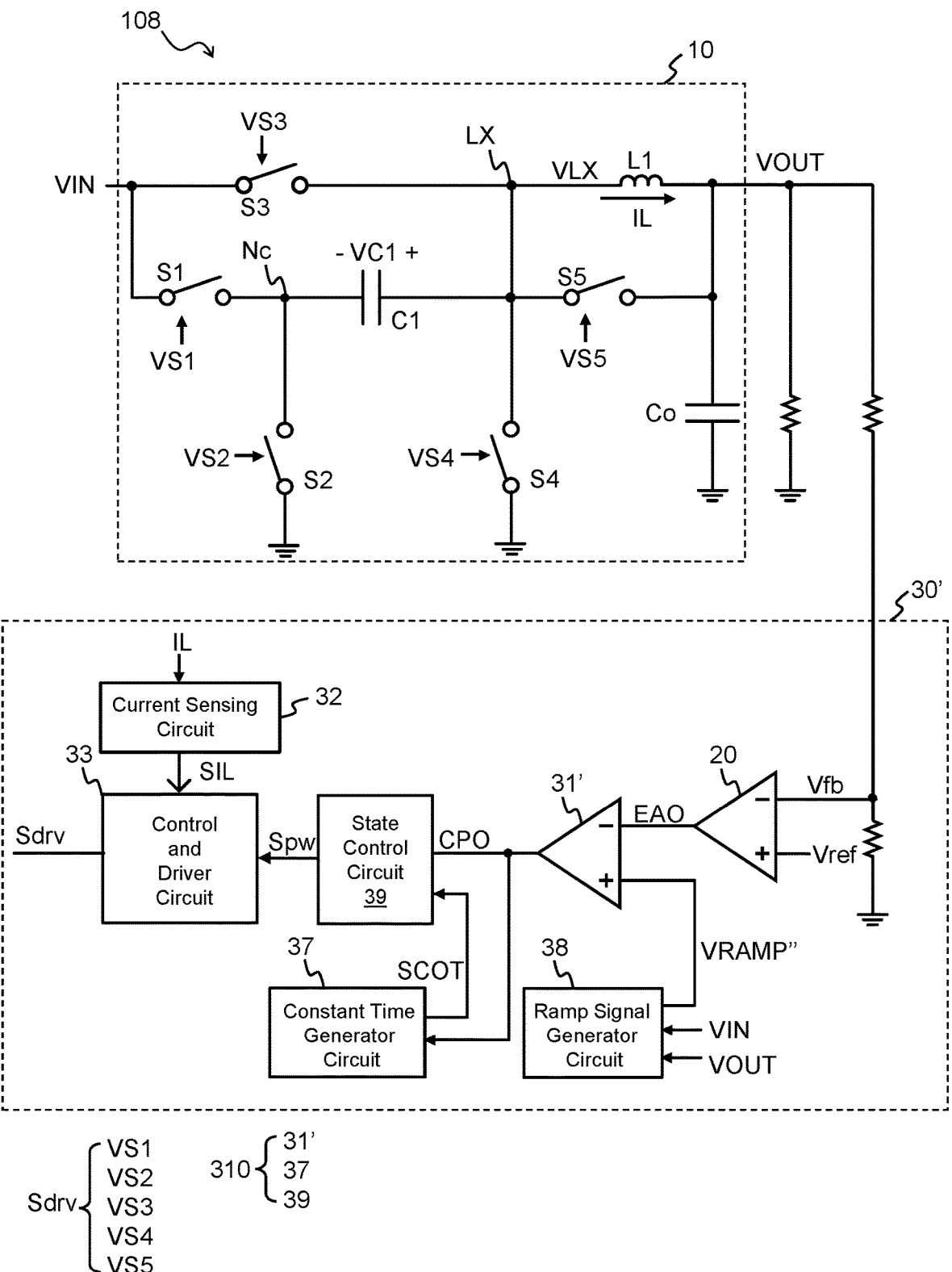
FIG. 3C shows a schematic circuit diagram of a converter control circuit in a switching converter circuit according to yet another exemplary embodiment of the present invention.

FIG. 3C shows a schematic circuit diagram of a converter control circuit in a switching converter circuit according to yet another exemplary embodiment of the present invention. The converter control circuit 30' of this embodiment shown in FIG. 3C controls the power stage circuit 10 to operate in a constant ON-time mode. The converter control circuit 30' of this embodiment shown in FIG. 3C is similar to the converter control circuit 30 of the embodiment shown in FIG. 3A, but is different in that: the converter control circuit 30' of this embodiment shown in FIG. 3C includes a constant time generator circuit 37, a ramp signal generator circuit 38 and a state control circuit 39. In this embodiment, a modulation circuit 310 includes a comparator 31', the constant time generator circuit 37 and the state control circuit 39. The ramp signal generator circuit 38 is configured to generate a ramp signal VRAMP'' according to the input voltage VIN and the output voltage VOUT. The comparator 31' is configured to operably compare the feedback compensation signal EAO with the ramp signal VRAMP'', so as to generate a comparison result CPO. The constant time generator circuit 37 is configured to operably generate a constant time signal SCOT in accordance with the comparison result CPO. The state control circuit 39 is configured to operably generate a modulation signal Spw having a constant ON-time according to the comparison result CPO and the constant time signal SCOT.

Figure 4:
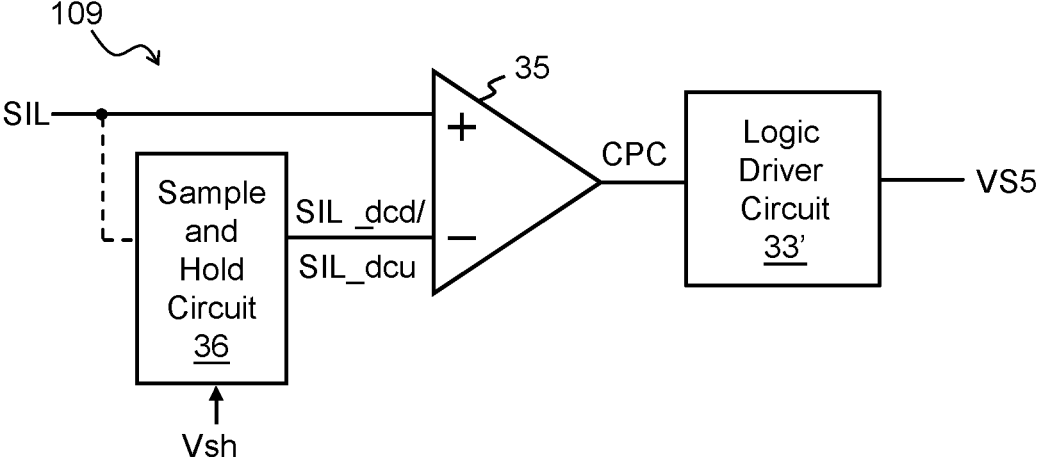
FIG. 4 shows a schematic circuit diagram of a part of the control and driver circuit for use in controlling a circulation switch in a switching converter circuit according to an exemplary embodiment of the present invention.

FIG. 4 shows a schematic circuit diagram of a part of the control and driver circuit for use in controlling a circulation switch in a switching converter circuit according to an exemplary embodiment of the present invention. As shown in FIG. 4, the part of the control and driver circuit 109 for controlling the circulation switch S5 includes: a logic driver circuit 33', a circulation comparator 35 and a sample and hold circuit 36. In a case where the switching converter circuit operates in a step-down mode, the sample and hold circuit 36 is configured to operably generate a step-down sample level SIL_dcd according to the current sensing signal SIL and a sample-and-hold control signal Vsh, and in a case where the switching converter circuit operates in a step-up mode, the sample and hold circuit 36 is configured to operably generate a step-up sample level SIL_dcu according to the current sensing signal SIL and the sample-and-hold control signal Vsh. The circulation comparator 35 is configured to operably compare the current sensing signal SIL with the step-down sample level SIL_dcd or with the step-up sample level SIL_dcu, to generate a circulation comparison result CPC. The logic driver circuit 33' is configured to operably generate the operation signal VS5 according to the circulation comparison result CPC.

Figure 5:
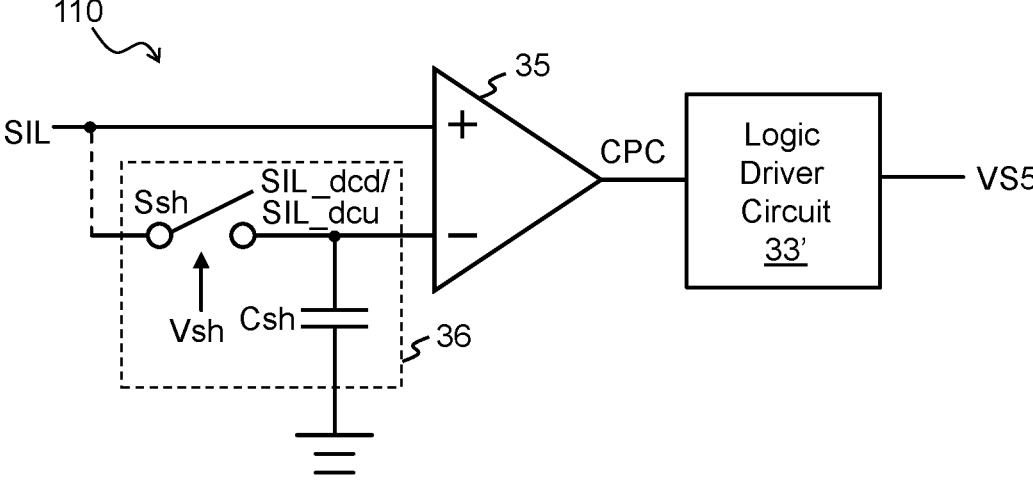
FIG. 5 shows a schematic circuit diagram of a part of the control and driver circuit for use in controlling a circulation switch in a switching converter circuit according to another exemplary embodiment of the present invention.

FIG. 5 shows a schematic circuit diagram of a part of the control and driver circuit for use in controlling a circulation switch in a switching converter circuit according to an exemplary embodiment of the present invention. In this embodiment, the sample and hold circuit 36 includes: a sample and hold switch Ssh and a sample and hold capacitor Csh. The sample and hold switch Ssh switches according to the sample-and-hold control signal Vsh, so as to sample a signal related to the current sensing signal SIL at a time point when the sample-and-hold control signal Vsh is disabled, so that the above-mentioned step-down sample level SIL_dcd or step-up sample level SIL_dcu are stored and maintained within the sample and hold capacitor Csh.

Figures 6A, 6B, 6C:
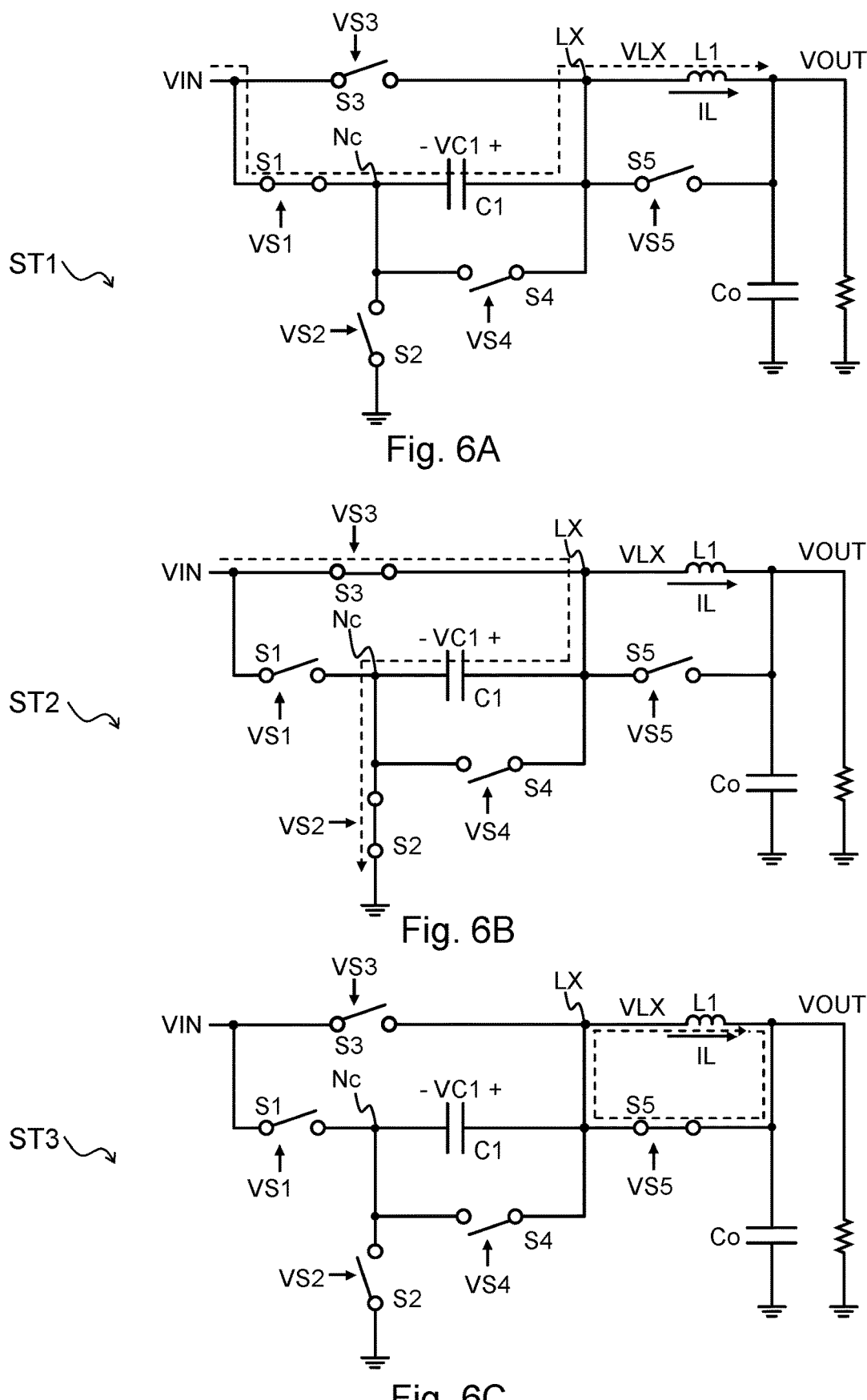
FIG. 6A to FIG. 6C, FIG. 7A to FIG. 7C, FIG. 8A to FIG. 8C and FIG. 9 respectively show schematic circuit diagrams and operation flows of a switching converter circuit according to different embodiments of the present invention, depicting that the switching converter circuit operates in different operation modes.
Figures 7A, 7B, 7C:
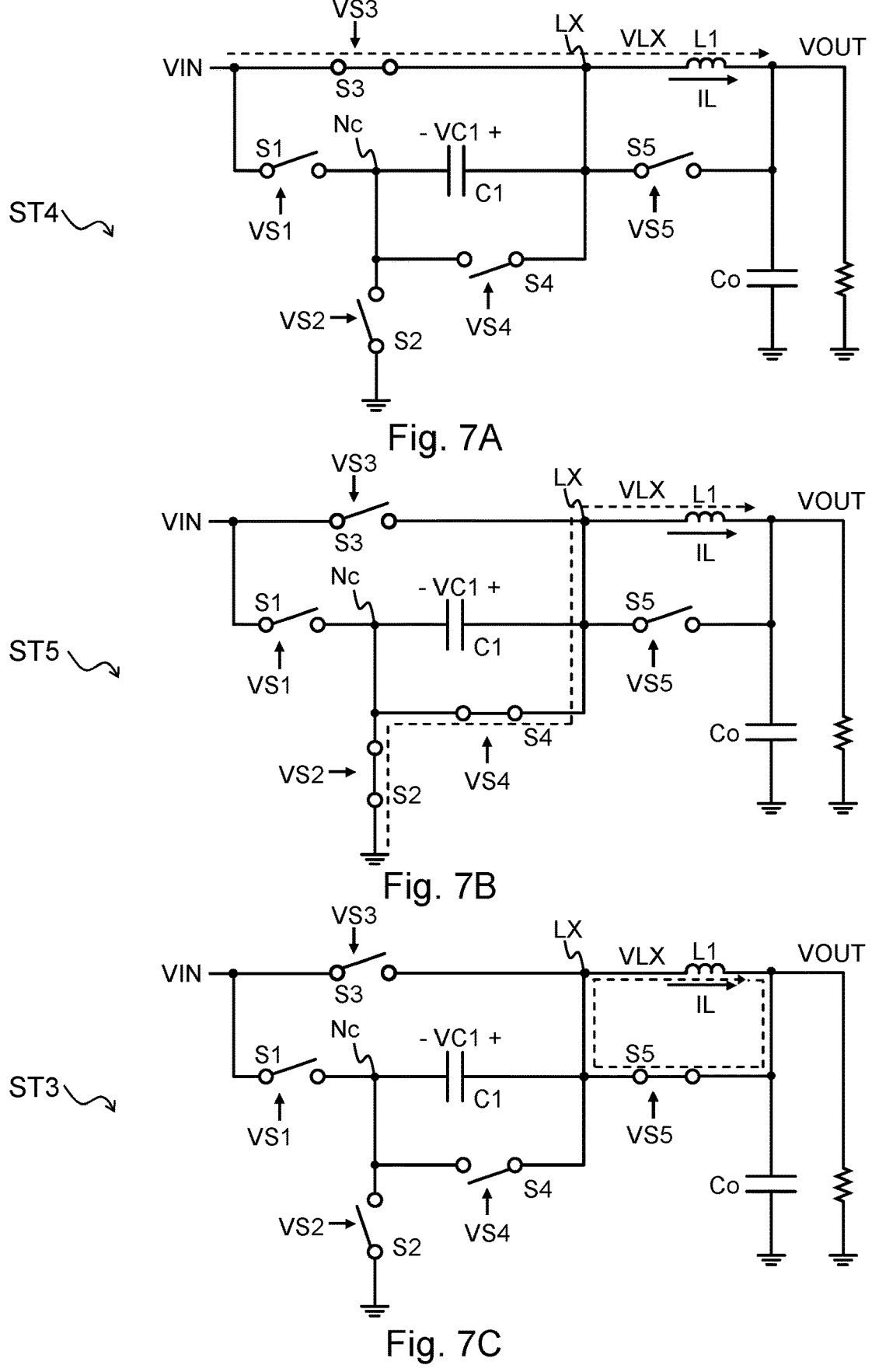
Figures 8A, 8B, 8C:
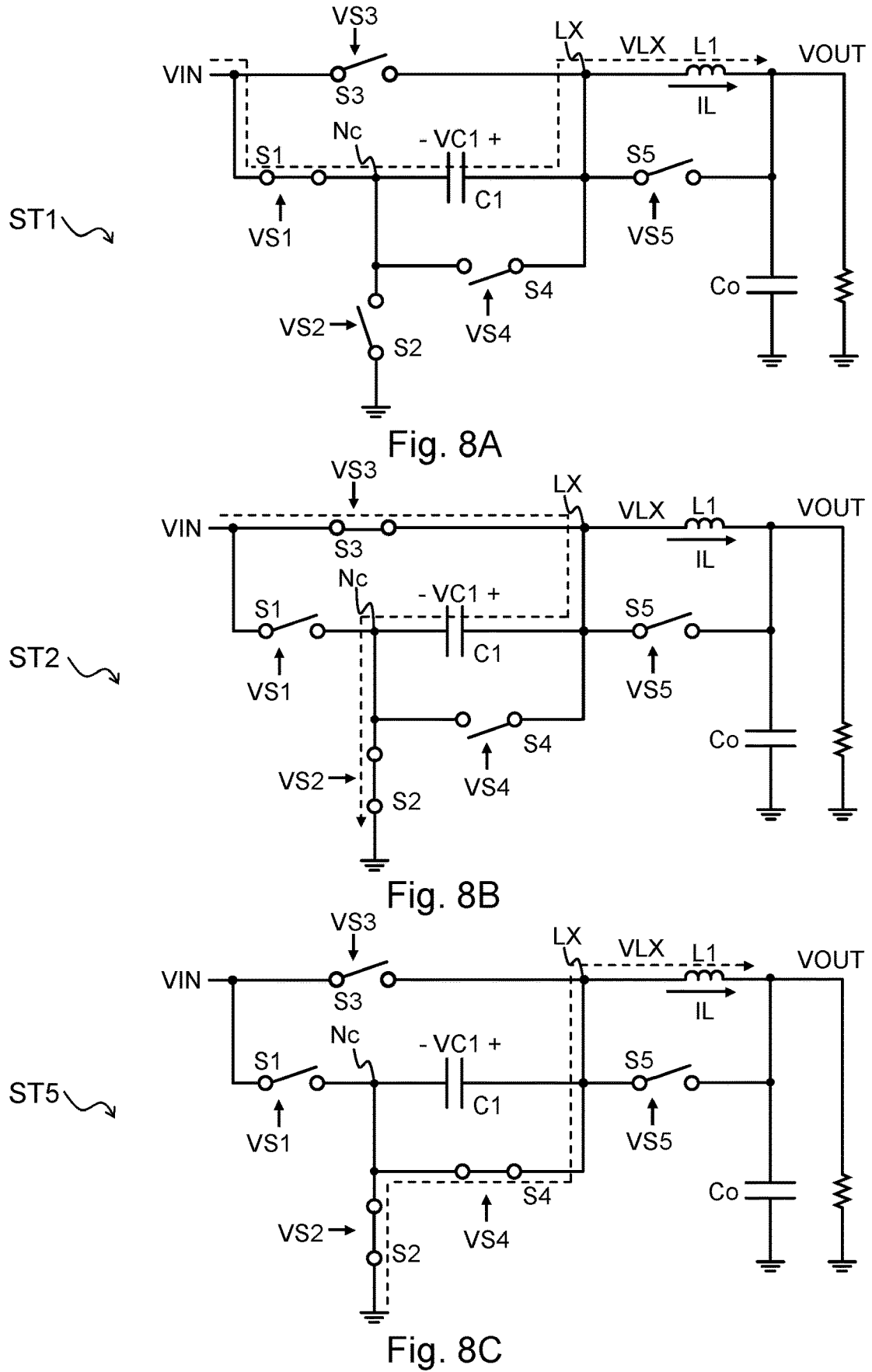
Figure 9:
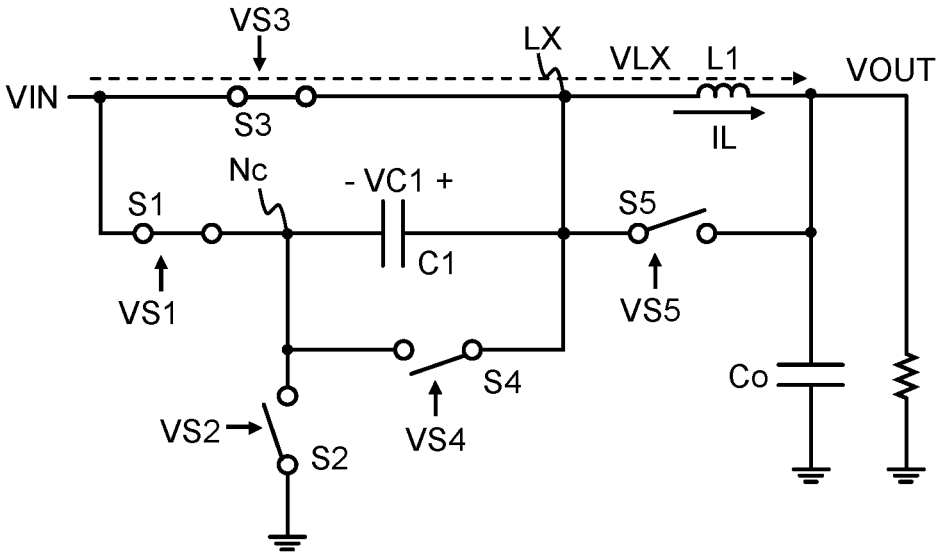
Figures 10A, 10B, 10C:
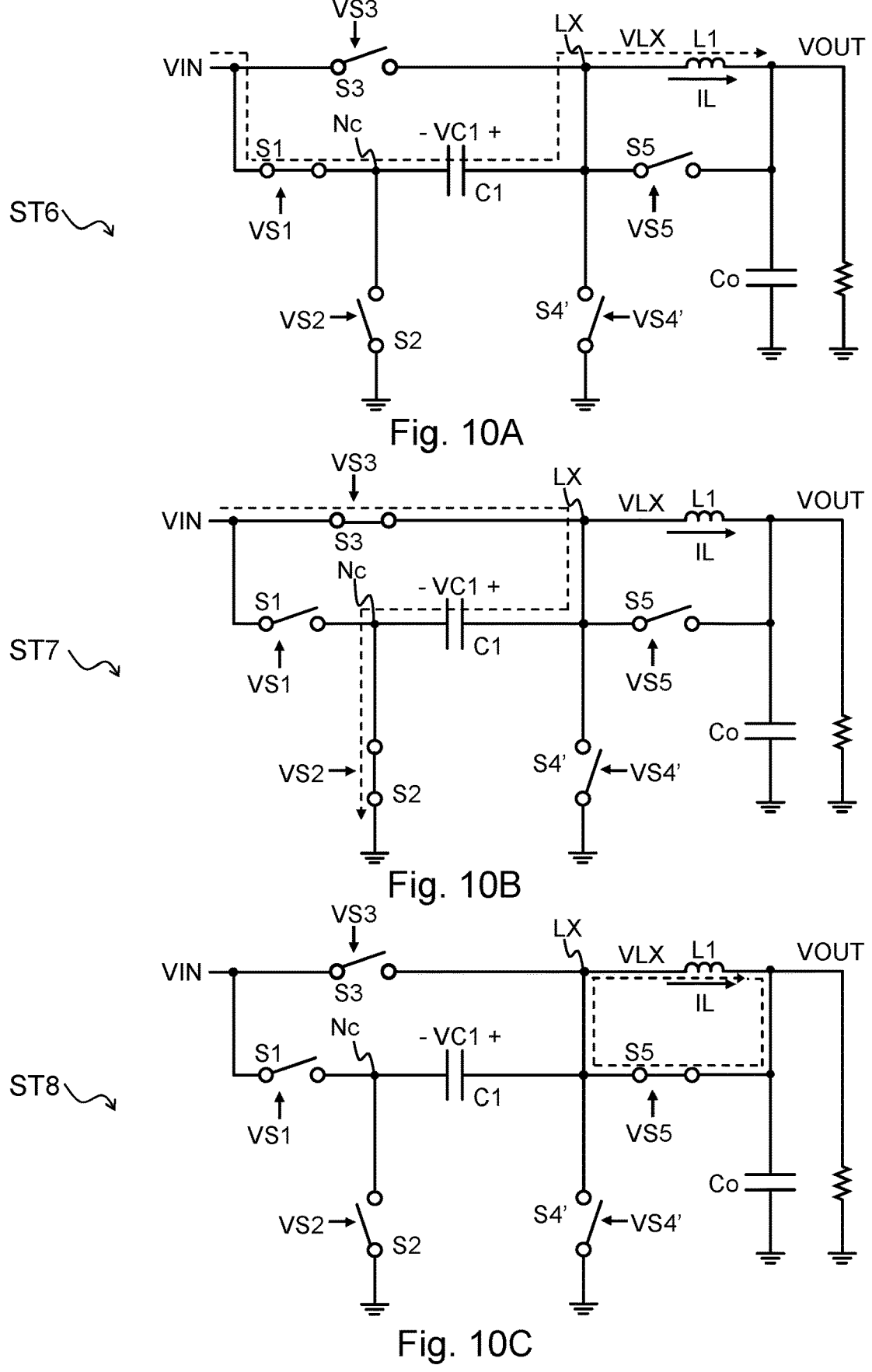
FIG. 10A to FIG. 10C, FIG. 11A to FIG. 11C, FIG. 12A to FIG. 12C and FIG. 13 respectively schematic circuit diagrams and operation flows of a switching converter circuit according to other different embodiments of the present invention, depicting that the switching converter circuit operates in different operation modes.
Figures 11A, 11B, 11C:
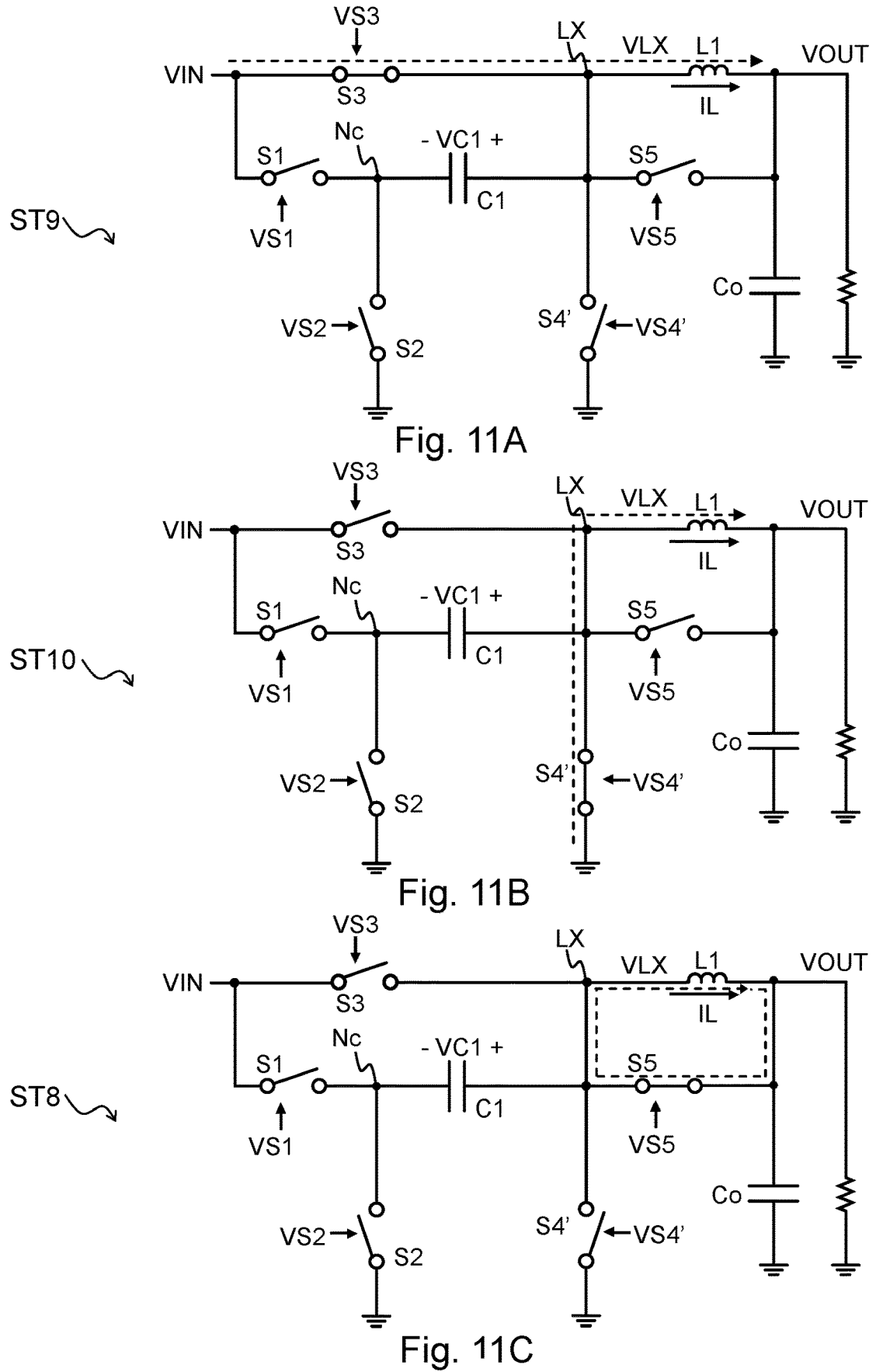
Figures 12A, 12B, 12C:
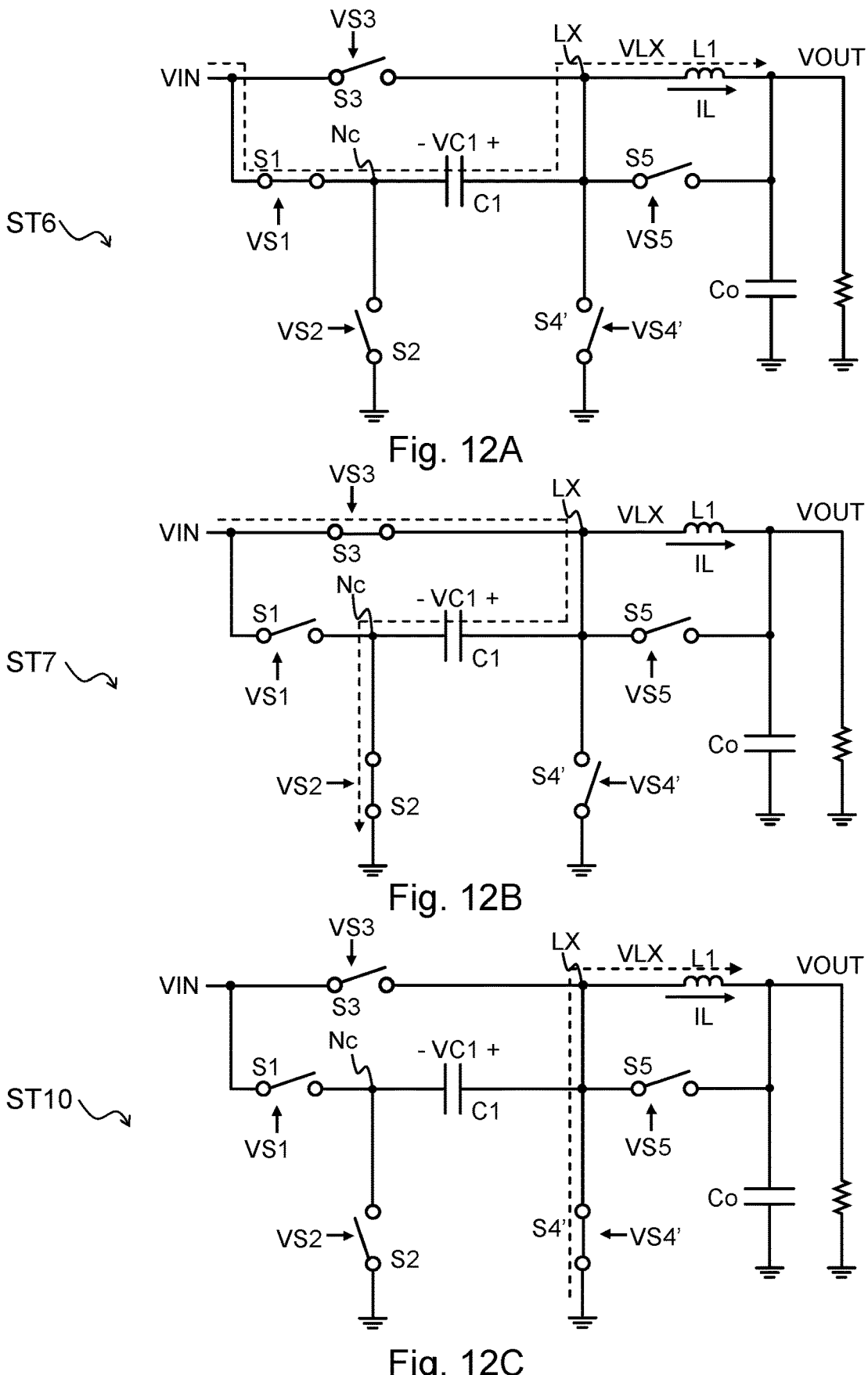
Figure 13:
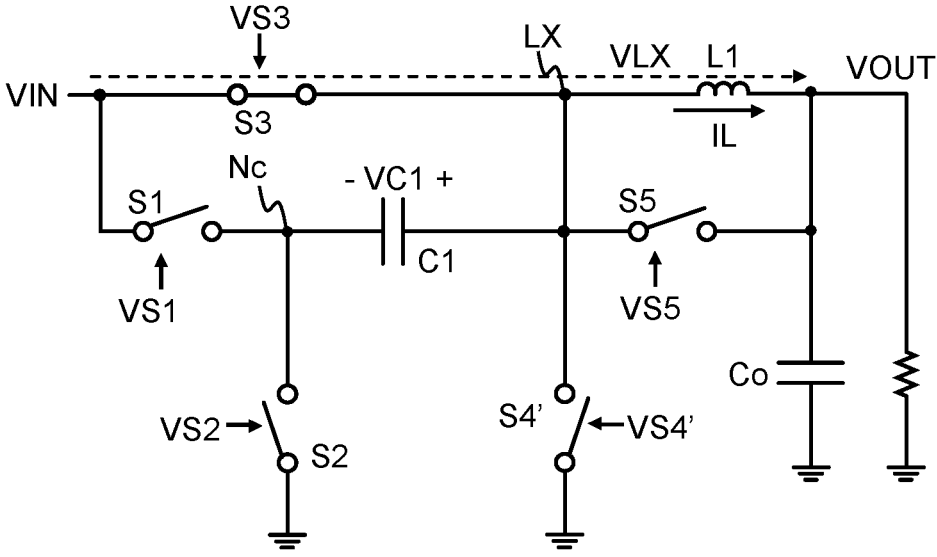

FIG. 6A to FIG. 6C, FIG. 7A to FIG. 7C, FIG. 8A to FIG. 8C and FIG. 9 respectively show schematic circuit diagrams and operation flows of a switching converter circuit according to different embodiments of the present invention, depicting that the switching converter circuit operates in different operation modes. In more detail, FIG. 6A to FIG. 6C show the operation flow in a step-up mode; FIG. 7A to FIG. 7C show the operation flow in in a step-down mode; FIG. 8A to FIG. 8C show the operation flow in in a buck-boost mode; FIG. 9 shows the operation flow in in a bypass mode. Please refer to FIG. 6A along with FIG. 14A. In state ST1, the ground switch S2, the high side switch S3, the low side switch S4 and the circulation switch S5 are switched OFF, whereas, the pump switch S1 is switched ON according to the operation signal VS1, so that the capacitor C1 and the inductor L1 are connected in series between the input voltage VIN and the output voltage VOUT. Note that, in a case where the embodiment shown in FIG. 6A corresponds to the embodiment shown in FIG. 2A, in the state ST1 shown in FIG. 6A, because the low side switch S4 is connected in series to the ground switch S2, the low side switch S4 and the ground switch S2 together share a voltage stress of 2*VIN, that is, each of the low side switch S4 and the ground switch S2 simply withstands a voltage stress of VIN. As a result, the related transistor devices can be manufactured by a low voltage manufacture process. For example, the low side switch S4 and the ground switch S2 can both be a transistor having a same low withstand voltage, to reduce the manufacturing cost and size of the overall circuit.

Figure 14A:
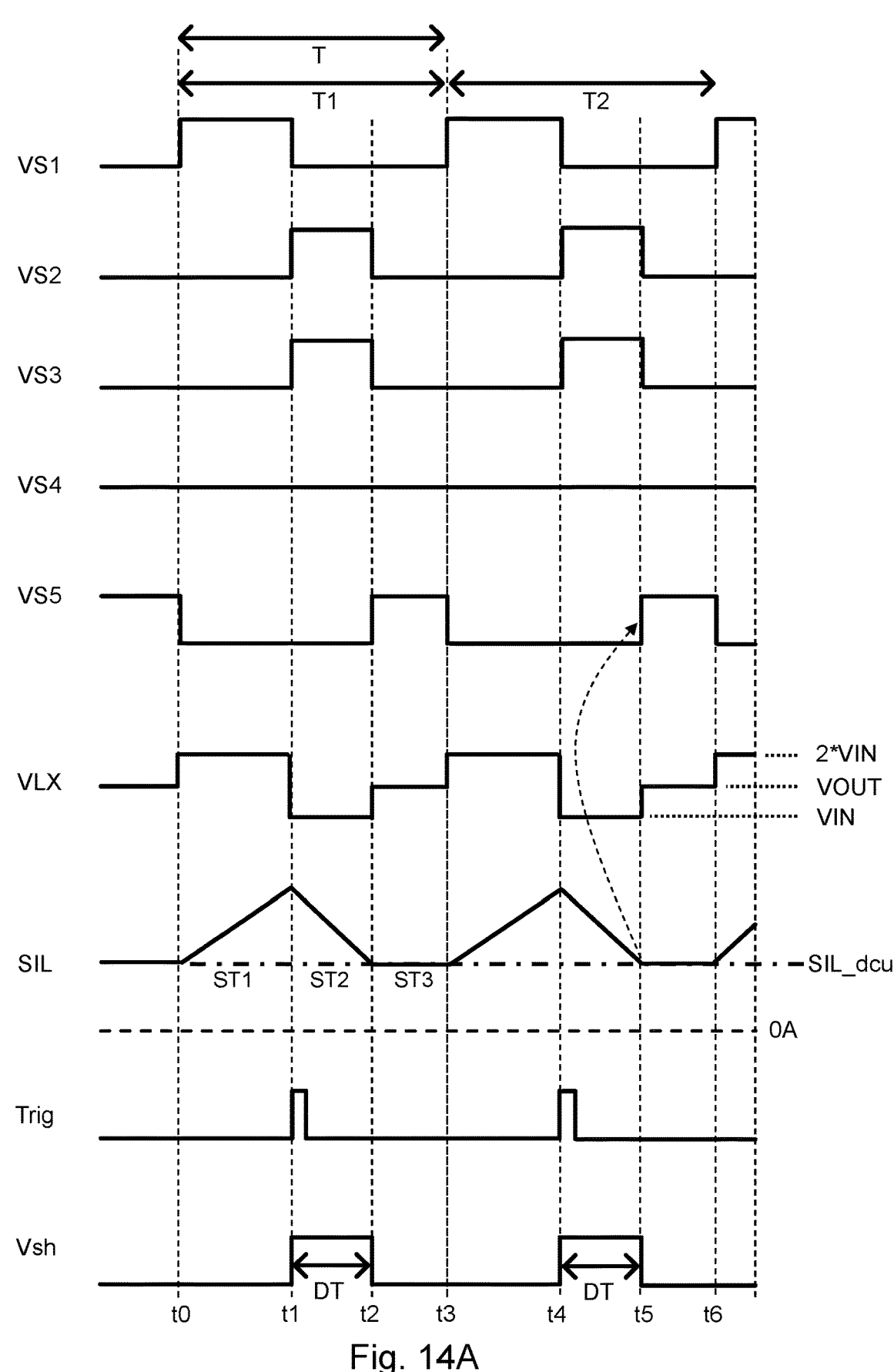
FIG. 14A, FIG. 14B and FIG. 14C respectively illustrate signal waveform diagrams depicting signals during the operation of a switching converter circuit according to an exemplary embodiment of the present invention.

Please refer to FIG. 6B along with FIG. 14A. In state ST2, the pump switch S1, the low side switch S4 and the circulation switch S5 are switched OFF, whereas, the ground switch S2 and the high side switch S3 are switched ON according to the operation signal VS2 and the operation signal VS3, respectively, so that the capacitor C1 is electrically connected between the input voltage VIN and the ground potential and so that the switching node LX is coupled to the input voltage VIN.

To elaborate in more detail, as shown by FIG. 6A, FIG. 6B and FIG. 14A, in a situation where the switching converter circuit operates in the step-down mode, the power switches S1~S5 are configured to operably switch the capacitor C1 and the inductor L1, so that in the state ST2, the input voltage VIN charges the capacitor C1, while in the meantime, the switching node voltage VLX is electrically connected to the input voltage VIN; besides, in the state ST1, the end Nc of the capacitor C1 is electrically connected to the input voltage VIN, so that the voltage VC1 across the capacitor C1 is added with the input voltage VIN, whereby the switching node voltage VLX becomes a pumped voltage. That is, through aforestated operations executed by the plural power switches S1~S5, the switching node voltage VLX at the switching node LX is switched between the pumped voltage and the input voltage VIN, thus converting the input power to the output power, wherein the pumped voltage is greater than the input voltage VIN. Because in a steady state, the voltage VC1 across the capacitor C1 has a level of the input voltage VIN, the pumped voltage is equal to 2-fold of the input voltage VIN. From one perspective, in the situation where the switching converter circuit operates in the step-up mode, on one hand, the switched capacitor part of the switching converter circuit steps up the voltage by the charge pump effect; on the other hand, although the switched inductor part of the switching converter circuit executes a step-down operation, the output voltage VOUT is still greater than the input voltage VIN, so the voltage conversion from the input voltage VIN to the output voltage VOUT is still a boost conversion (step-up conversion).

Please refer to FIG. 6C along with FIG. 14A. In state ST3, the pump switch S1, the ground switch S2, the high side switch S3 and the low side switch S4 are switched OFF, whereas, the circulation switch S5 is switched ON according to the operation signal VS5, so that the inductor current IL circulates within a circulation circuit constituted by the inductor L1 and the circulation switch S5. As shown by the state ST3 in FIG. 6C, in the situation where the switching converter circuit operates in the step-up mode, within a circulation period in each switching cycle, the circulation switch S5 is switched ON, so that the switching node voltage VLX is conducted to the output voltage VOUT, and the inductor current IL circulates within the circulation circuit at a direct current (DC) current level. The details of the circulation period and the DC current level will be explained later.

From one perspective, according to the present invention, in the step-up mode, the power switches S1~S5 control the power stage circuit to switch among the state ST1, the state ST2 and the state ST3, so that the switching node voltage VLX is switched among the pumped voltage, the input voltage VIN and the output voltage VOUT, thus converting the input power to the output power.

Figure 14B:
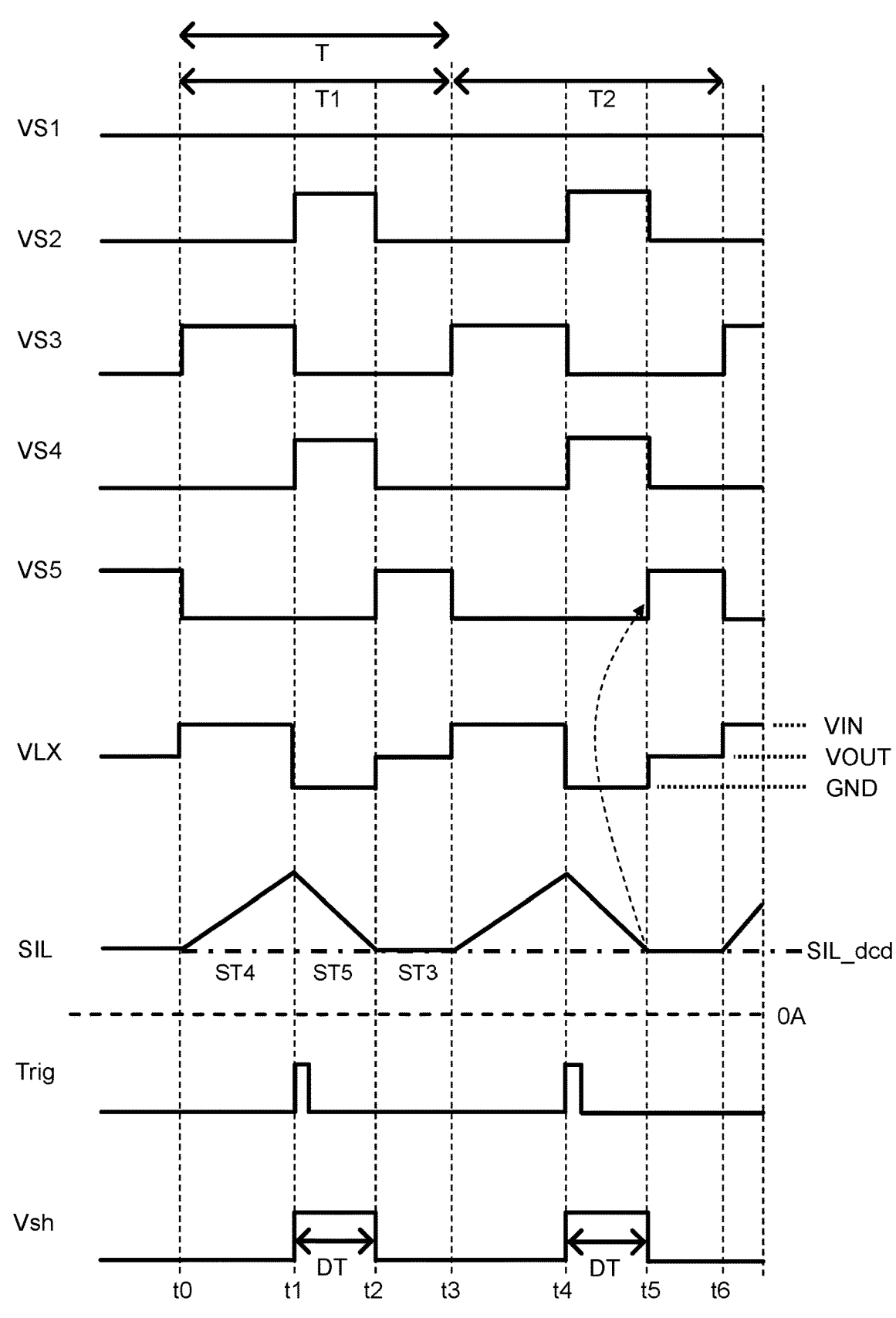

Please refer to FIG. 7A along with FIG. 14B. In state ST4, the pump switch S1, the ground switch S2, the low side switch S4 and the circulation switch S5 are switched OFF, whereas, the high side switch S3 is switched ON according to the operation signal VS3, so that the switching node LX is electrically connected to the input voltage VIN. Please refer to FIG. 7B along with FIG. 14B. In state ST5, the pump switch S1, the high side switch S3 and the circulation switch S5 are switched OFF, whereas, the ground switch S2 and the low side switch S4 are switched ON according to the operation signal VS2 and the operation signal VS4, respectively, so that the switching node LX is electrically connected to the ground potential. That is, as shown by the state ST4 in FIG. 7A and as shown by the state ST5 in FIG. 7B, in a situation where the switching converter circuit operates in a step-down mode, the power switches S1~S5 switch the connections of the switching node LX, so that the switching node voltage VLX at the switching node LX is switched between the input voltage VIN and the ground potential, thus converting the input power to the output power. In this embodiment, the input voltage VIN is greater than or equal to the output voltage VOUT.

Please refer to FIG. 7C along with FIG. 14B. In state ST3, the pump switch S1, the ground switch S2, the high side switch S3, the low side switch S4 and are switched OFF, whereas, the circulation switch S5 is switched ON according to the operation signal VS5, so that the inductor current IL circulates within the circulation circuit constituted by the inductor L1 and the circulation switch S5. As shown by the state ST3 in FIG. 7C, in the situation where the switching converter circuit operates in the step-down mode, within a circulation period in each switching cycle, the circulation switch S5 is controlled to be ON, so that the switching node voltage VLX is conducted to the output voltage VOUT. As shown in FIG. 14B, in a steady state, the inductor current IL circulates within the circulation circuit with a DC current level. In regard to the details of circulation period and the DC current level, they will be explained later.

From one perspective, according to the present invention, in the step-down mode, the plural power switches S1~S5 are configured to operably control the power stage circuit to switch among the state ST4, the state ST5 and the state ST3, so that the switching node voltage VLX is switched among the input voltage VIN, the ground potential and the output voltage VOUT, thus converting the input power to the output power.

It is worthwhile mentioning that, according to the present invention, in the step-down mode or the step-up mode, within the circulation period corresponding to the step-down mode or the circulation period corresponding to the step-up mode, when the circulation switch S5 is turned ON, the inductor L1 and the circulation switch S5 constitute a circulation circuit, such that the double pole generated by the inductor L1 and the output capacitor Co at least partially degenerates toward a single pole, thus enhancing the stability and bandwidth of the switching converter circuit according to the present invention.

Please refer to FIG. 8A, FIG. 8B and FIG. 8C. As shown by the state ST1 in FIG. 8A, the state ST2 in FIG. 8B and the state ST5 in FIG. 8C, in a situation where the switching converter circuit operates in a buck-boost mode, the plural power switches S1~S5 are configured to operably switch the capacitor C1 and the inductor L1, so that the switching node voltage VLX is switched between the pumped voltage, the input voltage VIN and the ground potential, thus converting the input power to the output power. In this embodiment, the output voltage VOUT can be greater than, lower than or equal to the input voltage VIN. Additionally, when the switching converter circuit operates in the buck-boost mode, the switching converter circuit can operate in the state ST3 as shown in FIG. 7C; that is, within a circulation period in each switching cycle, the circulation switch S5 is controlled to be ON, so that the switching node voltage VLX is conducted to the output voltage VOUT.

As shown in FIG. 9, in a bypass mode, the high side switch S3 is always ON, so as to bypass the input power to the output power via the inductor L1.

FIG. 10A to FIG. 10C, FIG. 11A to FIG. 11C, FIG. 12A to FIG. 12C and FIG. 13 respectively show schematic circuit diagrams and operational diagrams of a switching converter circuit, depicting the switching converter circuit operating in different operation modes, according to different embodiments of the present invention. These embodiments shown in FIG. 10A to FIG. 10C, FIG. 11A to FIG. 11C, FIG. 12A to FIG. 12C and FIG. 13 are respectively similar to the embodiments shown in FIG. 6A to FIG. 6C, FIG. 7A to FIG. 7C, FIG. 8A to FIG. 8C and FIG. 9, but are respectively different in that: in these embodiments shown in FIG. 10A to FIG. 10C, FIG. 11A to FIG. 11C, FIG. 12A to FIG. 12C and FIG. 13, there is a low side switch S4' which is coupled between a switching node LX and a ground potential. The state ST6, the state ST7 and the state ST8 correspond to the ST1, the state ST2 and the state ST3, respectively, whereas, the state ST9 and the state ST10 correspond to the ST4 and the state ST5, respectively. Because the low side switch S4' in these embodiments of FIG. 10A to FIG. 10C, FIG. 11A to FIG. 11C, FIG. 12A to FIG. 12C and FIG. 13 is coupled between the switching node LX and the ground potential, when it is required for the switching node LX to be electrically connected to the ground potential (e.g., in the state ST10), the low side switch S4' is controlled to be ON, whereas, the ground switch S2 is controlled to be OFF.

When the switching converter circuit operates in the other states, it operates similarly as in the foregoing embodiments of FIG. 6A to FIG. 6C, FIG. 7A to FIG. 7C, FIG. 8A to FIG. 8C and FIG. 9, so the details thereof are not redundantly repeated here.

Figure 14C:
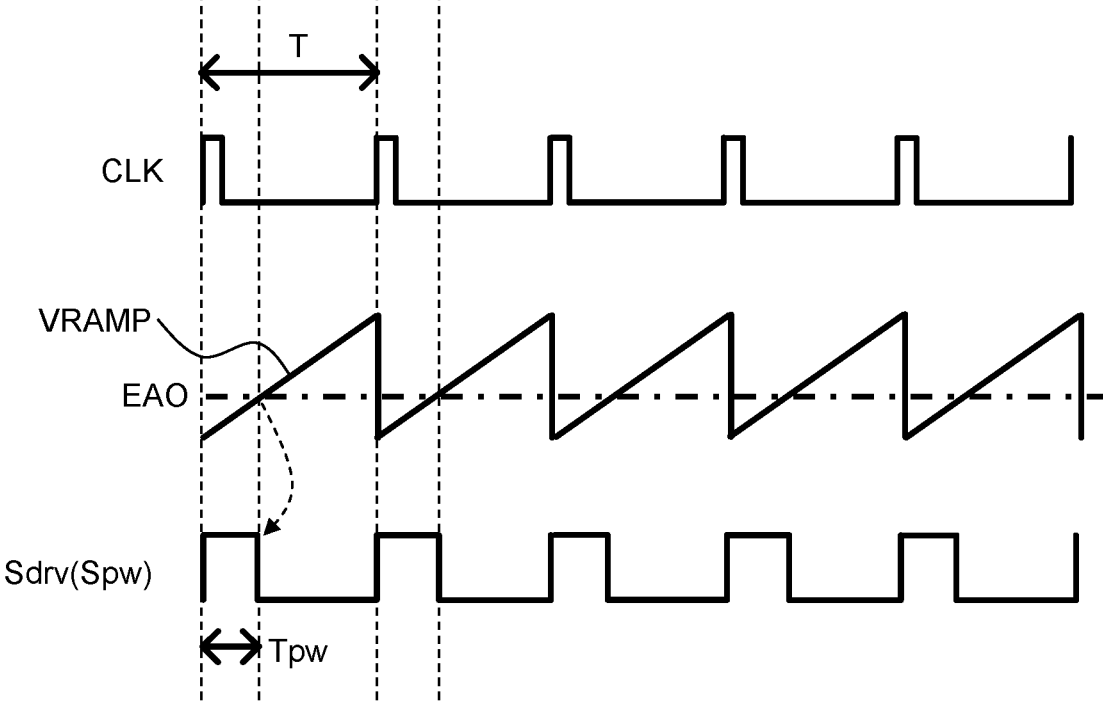

FIG. 14A, FIG. 14B and FIG. 14C respectively illustrate signal waveform diagrams depicting signals during the operation of a switching converter circuit according to an exemplary embodiment of the present invention. Operation signals VS1~VS5, a switching node voltage VLX, a current sensing signal SIL, a trigger signal Trig and a sample-and-hold control signal Vsh are illustrated in both FIG. 14A and FIG. 14B. A clock signal CLK, a ramp signal VRAMP, a feedback compensation signal EAO, a driving signal Sdrv (or a modulation signal Spw) are illustrated in FIG. 14C.

FIG. 14A corresponds to a situation where the switching converter circuit operates in a step-up mode. In this embodiment, the level of the output voltage VOUT lies between the level of the pumped voltage (2*VIN) and the level of the input voltage VIN, wherein the precise level of the output voltage VOUT is determined according to the duty ratio of each state. Please refer to FIG. 14A along with FIG. 5 and FIG. 6A to FIG. 6C. In the situation where the switching converter circuit operates in the step-up mode, within each switching cycle (e.g., the first switching cycle T1), after a preset delay time DT has passed by the time point (e.g., time point t1) where the inductor L1 begins to be demagnetized, at such time point (e.g., time point t2), the sample and hold circuit 36 is configured to operably sample and hold the current sensing signal SIL, so as to obtain a step-up sample level SIL_dcu corresponding to the first switching cycle T1. Next, within a following switching cycle (e.g., the second switching cycle T2), when the current sensing signal SIL decreases to reach the step-up sample level SIL_dcu which is sampled and held within the preceding switching cycle (i.e., the first switching cycle T1), for example at time point t5, the operation signal VS5 is enabled, so as to initiate a circulation period (as shown by a period from time point t5 to time point t6 in FIG. 14A) corresponding to the second switching cycle T2, and the circulation switch S5 is turned ON. Similarly, within the second switching cycle T2, after the preset delay time DT has passed by the time point (e.g., time point t4) where the inductor L1 begins to be demagnetized, at such time point (e.g., time point t5), the sample and hold circuit 36 is triggered to once again sample and hold the current sensing signal SIL, so as to obtain a step-up sample level SIL_dcu corresponding to the second switching cycle T2, wherein such step-up sample level SIL_dcu serves to determine a time point to enter a circulation period in a following switching cycle. It is worthwhile mentioning that, in a steady state, the time point for executing the sampling and holding operation will overlap with the initiation time point of the circulation period (e.g., the time point t2 or the time point t5). On the other hand, in a transient state when there is a load variation, the sampling and holding time point may not overlap with the initiation time point of the circulation period. From one perspective, the time length of the preset delay time DT decides the time length of the circulation period in the steady state.

FIG. 14B corresponds to a step-down mode. In this embodiment, the level of the output voltage VOUT lies between the level of the input voltage VIN and the ground potential, wherein the precise level of the output voltage VOUT is determined according to the duty ratio of each state. Please refer to FIG. 14B along with FIG. 5 and FIG. 7A to FIG. 7C. In the situation where the switching converter circuit operates in the step-down mode, within each switching cycle (e.g., a first switching cycle T1), after the preset delay time DT has passed by the time point (e.g., time point t1) where the inductor L1 begins to be demagnetized, at such time point (e.g., time point t2), the sample and hold circuit 36 is configured to operably sample and hold the current sensing signal SIL, so as to obtain a step-down sample level SIL_dcd corresponding to the first switching cycle T1. Within a following switching cycle (e.g., the second switching cycle T2), when the current sensing signal SIL decreases to reach the step-down sample level SIL_dcd which is sampled and held within the preceding switching cycle (i.e., the first switching cycle T1), for example at time point t5, the operation signal VS5 is enabled, so as to initiate a circulation period (as shown by a period from time point t5 to time point t6 in FIG. 14B) corresponding to the second switching cycle T2, and the circulation switch S5 is turned ON. Similarly, within the second switching cycle T2, after the preset delay time DT has passed by the time point (e.g., time point t4) where the inductor L1 begins to be demagnetized, at such time point (e.g., time point t5), the sample and hold circuit 36 is triggered to once again sample and hold the current sensing signal SIL, so as to obtain a step-down sample level SIL_dcd corresponding to the second switching cycle T2, wherein such step-down sample level SIL_dcd serves to determine a time point to enters a circulation period in a following switching cycle.

As shown in FIG. 14A and FIG. 14B, in the aforementioned step-up mode shown in FIG. 14A or the aforementioned step-down mode shown in FIG. 14B, the trigger signal Trig is triggered at the time point t1 where the current sensing signal SIL transits from rising (ramping-up) to falling (ramping-down), wherein the time point t1 for example can be synchronous with a rising edge of the operation signal VS2 determined by a loop. The trigger signal Trig serves to enable the sample-and-hold control signal Vsh. In one embodiment, the time length of an enable period of the sample-and-hold control signal Vsh (i.e., the delay time DT) can be set by a user, depending upon for example the requirements for loop stability and power consumption.

In the aforementioned embodiments shown in FIG. 14A and FIG. 14B, the current sensing signal SIL is positively correlated with the inductor current IL. For example, a time point at which the current sensing signal SIL transits from rising to falling corresponds to an occurrence time point of a peak of the current sensing signal SIL. The step-up sample level SIL_dcu corresponds to a DC current level of the current sensing signal SIL within the circulation period in the step-up mode, whereas, the step-down sample level SIL_dcd corresponds to the DC current level of the current sensing signal SIL within the circulation period in the step-down mode. Consequently, in the embodiments shown in FIG. 14A and FIG. 14B, in the steady state, the DC current level is lower than a peak of the inductor current IL.

FIG. 14C corresponds to voltage mode. As shown in FIG. 14C, a ramp signal VRAMP is generated according to a clock signal CLK having a switching cycle T, wherein the switching cycle T has a constant period, such that the modulation signal Spw has the constant period. Please refer to FIG. 14C along with FIG. 3A. In voltage mode, the modulation circuit 31 is configured to operably compare the feedback compensation signal EAO with the ramp signal VRAMP having a constant period, so as to decide a duty ratio of the modulation signal Spw, thereby regulating an electrical characteristic of the output power (e.g., the output voltage VOUT or the output current IOUT) to a target value. In one embodiment, the duty ratio is equal to a quotient of a pulse width Tpw of the modulation signal Spw divided by the switching cycle T. In one embodiment, the pulse width Tpw is configured to operably decide a period corresponding to, for example, the period from time point t0 to time point t1 in FIG. 14A.

FIG. 15 shows a comparison table between the present invention and the prior art with respect to unity gain bandwidth and phase margin, according to an exemplary embodiment of the present invention. FIG. 15 illustrates that: as compared to a prior art switching converter circuit having no circulation, either the prior art switching converter circuit operates in a voltage mode or in a current mode, the switching converter circuit of the present invention having circulation and operating in a voltage mode has a much better unit gain bandwidth and a much better phase margin.

In summary, as compared to the prior art configuration, the switching converter circuit of the present invention has merits including: that, it is far more easier for the present invention to design a compensator; that, the present invention has a reduced die size; that, the present invention has a reduced manufacturing cost of the overall IC; that, as compared to the prior art switching converter circuit, the present invention is faster in terms of DVS and transient state response; that, the present invention has a smaller output ripple and better power conversion efficiency; that, as compared to the prior art adopting a four-switch buck-boost (FSBB) converter configuration, the present invention mitigates the issue of safe operating area (SOA) resulting from equivalent series inductance (ESL), so the present invention has a much higher SOA tolerance.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A switching converter circuit, which is configured to operably convert an input power to an output power, wherein the input power includes an input voltage and the output power includes an output voltage; the switching converter circuit comprising:

a feedback compensation circuit, which is configured to operably generate a feedback compensation signal according to a difference between a feedback signal related to the output power and a reference signal;

a modulation circuit, which is configured to operably generate a modulation signal in accordance with the feedback compensation signal and a ramp signal having a switching cycle;

a power stage circuit including a plurality of power switches, wherein the plurality of power switches are configured to operably switch an inductor according to the modulation signal, thus converting the input power to the output power, wherein the inductor is coupled between a switching node and the output power, wherein the plurality of power switches include a circulation switch, wherein the circulation switch is coupled in parallel with the inductor, wherein when the circulation switch conducts, the inductor and the circulation switch constitute a circulation circuit;

a current sensing circuit, which is configured to operably generate a current sensing signal, wherein the current sensing signal is related to an inductor current flowing through the inductor; and a control and driver circuit, which is configured to operably generate a driving signal according to the modulation signal and the current sensing signal, wherein the driving signal is configured to operably control the plurality of power switches;

wherein in a step-down mode, the plurality of power switches are configured to operably switch the switching node, so that a switching node voltage at the switching node is switched between the input voltage and a ground potential, thus converting the input power to the output power, wherein the input voltage is greater than or equal to the output voltage;

wherein in the step-down mode, within a circulation period in each switching cycle, the circulation switch is controlled to conduct the switching node voltage to the output voltage, wherein in a steady state, the inductor current circulates within the circulation circuit with a first DC current level, wherein the first DC current level is lower than a peak of the inductor current;

wherein the plurality of power switches are further configured to operably switch a capacitor, wherein an end of the capacitor is coupled to the switching node;

wherein in a step-up mode, the plurality of power switches are configured to operably switch the capacitor and the inductor, so that the switching node voltage at the switching node is switched between a pumped voltage and the input voltage, thus converting the input power to the output power, wherein the pumped voltage is greater than the input voltage and is related to the input voltage and a voltage across the capacitor, wherein the output voltage lies between the pumped voltage and the input voltage;

wherein in the step-up mode, within the circulation period in each switching cycle, the circulation switch is controlled to conduct, so that the switching node voltage is conducted to the output voltage, whereby the inductor current circulates within the circulation circuit with a second DC current level, wherein in a steady state, the second DC current level is lower than the peak of the inductor current.

2. The switching converter circuit as claimed in claim 1, wherein in a buck-boost mode, the plurality of power switches are configured to operably switch the capacitor and the inductor, so that the switching node voltage at the switching node is switched between the pumped voltage, the input voltage and the ground potential, thus converting the input power to the output power, wherein the output voltage is greater than, lower than or equal to the input voltage.

3. The switching converter circuit as claimed in claim 1, wherein the ramp signal is generated according to a clock signal having the switching cycle, wherein the switching cycle has a constant period, such that the modulation signal has the constant period.

4. The switching converter circuit as claimed in claim 3, wherein the modulation circuit is configured to operably compare the feedback compensation signal with the ramp signal having the constant period to decide a duty ratio of the modulation signal, thereby regulating an electrical characteristic of the output power to a target value.

5. The switching converter circuit as claimed in claim 1, further comprising a sample and hold circuit;

wherein in the step-down mode, subsequent to a first time point at which the inductor begins to be demagnetized, at a second time point after a preset delay time has passed by the first time point, the sample and hold circuit samples and holds the current sensing signal to obtain a step-down sample level, and within a present switching cycle, when the current sensing signal decreases to reach the step-down sample level, the circulation period corresponding to the present switching cycle is initiated and the circulation switch conducts; and/or wherein in the step-up mode, subsequent to a third time point at which the inductor begins to be demagnetized, at a fourth time point after the preset delay time has passed by the third time point, the sample and hold circuit samples and holds the current sensing signal, so as to obtain a step-up sample level, and within the present switching cycle, when the current sensing signal decreases to reach the step-up sample level, the circulation period corresponding to the present switching cycle is initiated and the circulation switch conducts.

6. The switching converter circuit as claimed in claim 1, wherein in the step-down mode or the step-up mode, within the circulation period corresponding to the step-down mode or the circulation period corresponding to the step-up mode, when the circulation switch conducts, the inductor and the circulation switch constitute the circulation circuit, such that a double pole generated by the inductor and an output capacitor at least partially degenerates toward a single pole, thus enhancing a stability and bandwidth of the switching converter circuit.

7. The switching converter circuit as claimed in claim 1, wherein the plurality of power switches further include a high side switch coupled between the input power and the switching node, ground switch coupled between another end of the capacitor and the ground potential, a low side switch coupled between the switching node and the another end of the capacitor or coupled between the switching node and the ground potential, and a pump switch coupled between the another end of the capacitor and the input power.

8. The switching converter circuit as claimed in claim 7, wherein in a bypass mode, the high side switch is controlled to conduct to bypass the input power to the output power via the inductor.

9. The switching converter circuit as claimed in claim 7, wherein the low side switch is coupled between the switching node and the another end of the capacitor, and wherein the low side switch and the ground switch are transistors having a same withstand voltage.

10. The switching converter circuit as claimed in claim 1, wherein a time length of the circulation period is correlated with a stability of the switching converter circuit and/or a power conversion efficiency of the switching converter circuit.

* * * * *